(12) United States Patent
Olechnowicz et al.

(10) Patent No.: US 9,939,113 B2
(45) Date of Patent: Apr. 10, 2018

(54) ADDITIVES FOR DRAG REDUCING POLYMERS

(71) Applicant: LIQUIDPOWER SPECIALTY PRODUCTS INC., Houston, TX (US)

(72) Inventors: Michael R. Olechnowicz, Ponca City, OK (US); Timothy L. Burden, Ponca City, OK (US); Tommy C. Ross, Tonkawa, OK (US)

(73) Assignee: LIQUIDPOWER SPECIALITY POWER SPECIALTY PRODUCTS, INC., Houston, TX (US)

( * ) Notice: Subject to any disclaimer, the term of this patent is extended or adjusted under 35 U.S.C. 154(b) by 0 days.

(21) Appl. No.: 15/036,874

(22) PCT Filed: Nov. 17, 2014

(86) PCT No.: PCT/US2014/065897
§ 371 (c)(1),
(2) Date: May 16, 2016

(87) PCT Pub. No.: WO2015/077174
PCT Pub. Date: May 28, 2015

(65) Prior Publication Data
US 2016/0281934 A1    Sep. 29, 2016

(51) Int. Cl.
*F17D 1/16* (2006.01)
*F17D 1/00* (2006.01)
*C08K 5/01* (2006.01)
*E21B 41/00* (2006.01)

(52) U.S. Cl.
CPC .............. *F17D 1/16* (2013.01); *C08K 5/01* (2013.01); *F17D 1/00* (2013.01); *E21B 41/00* (2013.01)

(58) Field of Classification Search
CPC ............... F17D 1/00; F17D 1/16; C08K 5/01
USPC ............................................ 523/175
See application file for complete search history.

(56) References Cited

U.S. PATENT DOCUMENTS

| | | |
|---|---|---|
| 3,758,406 A | 9/1973 | Malone et al. |
| 4,983,186 A | 1/1991 | Naiman et al. |
| 2010/0130681 A1 | 5/2010 | Smith et al. |

OTHER PUBLICATIONS

Eurasian Patent Office First Official Action (with attached English translation) for Application No. 201690851; date unknown; 5 total pages.

*Primary Examiner* — Edward J Cain
(74) *Attorney, Agent, or Firm* — Patterson + Sheridan, LLP

(57) ABSTRACT

A method of forming a drag reducing polymer formulation. The method begins by forming a drag reducing polymer. A hydrocarbon additive is then incorporated with the drag reducing polymer to form a drag reducing polymer formulation. The drag reducing polymer formulation is then used as a drag reducer in hydrocarbon pipelines.

19 Claims, No Drawings

ADDITIVES FOR DRAG REDUCING POLYMERS

FIELD OF THE INVENTION

A method of incorporating a hydrocarbon additive to a drag reducing polymer.

BACKGROUND OF THE INVENTION

When fluids are transported by a pipeline, there is typically a drop in fluid pressure due to friction between the wall of the pipeline and the fluid. Due to this pressure drop, for a given pipeline, fluid must be transported with sufficient pressure to achieve the desired throughput. When higher flow rates are desired through the pipeline, more pressure must be applied due to the fact that, as flow rates are increased, the difference in pressure caused by the pressure drop also increases. However, design limitations on pipelines limit the amount of pressure that can be employed. The problems associated with pressure drop are most acute when fluids are transported over long distances. Such pressure drops can result in inefficiencies that increase equipment and operation costs.

To alleviate the problems associated with pressure drop, many in the industry utilize drag reducers in the flowing fluid. When the flow of fluid in a pipeline is turbulent, high molecular weight polymeric drag reducers can be employed to enhance the flow. A drag reducer is a composition capable of substantially reducing friction loss associated with the turbulent flow of a fluid through a pipeline. The role of a drag reducer is to suppress the growth of turbulent eddies, which results in higher flow rate at a constant pumping pressure. Ultra-high molecular weight polymers are known to function well as drag reducers, particularly in hydrocarbon pipelines. In general, drag reduction depends in part upon the molecular weight of the polymer additive and its ability to dissolve in the hydrocarbon under turbulent flow. Effective drag reducers typically have molecular weights in excess of five million or even ten million.

Typically, drag reducers are injected into a pipeline just at the discharge side of a pumping station. A pump capable of surpassing the line pressure of the pipeline is used to inject the drag reducer into the pipeline. It has been shown that additives added to drag reducers can improve the ability of drag reducers to be injected into the pipeline.

There exists a need for an additive to improve the ability of drag reducers to be injected into the pipeline without adversely affecting the formulation of the drag reducer.

BRIEF SUMMARY OF THE DISCLOSURE

The disclosed technology provides a method of forming a drag reducing polymer formulation including forming a drag reducing polymer; and incorporating a hydrocarbon additive with the drag reducing polymer to form the drag reducing polymer formulation in which the drag reducing polymer formulation is used as a drag reducer in hydrocarbon pipelines.

The disclosed technology further provides a method of forming a drag reducing polymer in which the drag reducing polymer is a latex drag reducing polymer.

The disclosed technology further provides a method of forming a drag reducing polymer in which the drag reducing polymer is formed via emulsion polymerization.

The disclosed technology further provides a method of forming a drag reducing polymer in which the drag reducing polymer is formed via emulsion polymerization.

The disclosed technology further provides a method of forming a drag reducing polymer in which the hydrocarbon additive is selected from heptane, isooctane, kerosene, N-paraffin deplete kerosene, and combinations thereof.

The disclosed technology further provides a method of forming a drag reducing polymer in which the hydrocarbon additive has a distillation temperature less than 275° C.

The disclosed technology further provides a method of forming a drag reducing polymer in which the hydrocarbon pipelines are heavy oil pipelines.

The disclosed technology further provides a method of forming a drag reducing polymer in which the drag reducer suppresses the growth of turbulent eddies in the hydrocarbon pipelines.

The disclosed technology further provides a method of forming a drag reducing polymer in which the drag reducing polymer formulation includes at least about 25,000 repeating units.

The disclosed technology further provides a method of forming a drag reducing polymer in which the drag reducing polymer formulation has a weight average molecular weight of at least $1 \times 10^6$ g/mol.

The disclosed technology further provides a method of forming a drag reducing polymer in which from about 3 wt % to about 16 wt % hydrocarbon additive is incorporated into the drag reducer.

The disclosed technology further provides a method of forming a drag reducing polymer in which the hydrocarbon additive comes from a source different than the hydrocarbon pipelines.

The disclosed technology further provides a method of forming a drag reducing polymer in which the addition of the hydrocarbon additive does not affect the stability of the drag reducing polymer.

The disclosed technology further provides a method of forming a drag reducing polymer formulation including forming a latex drag reducing polymer via emulsion polymerization and incorporating from about 3 wt % to about 30 wt % of kerosene additive to the latex drag reducing polymer to form the drag reducing polymer formulation in which the drag reducing polymer formulation use used as a drag reducer in heavy oil pipelines.

The disclosed technology further provides a method of injecting a drag reducing polymer formulation including forming a latex drag reducing polymer via emulsion polymerization, incorporating from about 3 wt % to about 30 wt % of kerosene additive to the latex drag reducing polymer to form the drag reducing polymer formulation, and injecting the drag reducing polymer formulation into a heavy oil pipeline.

The disclosed technology further relates to a method of injecting a drag reducing polymer formulation in which the drag reducer suppresses the growth and turbulent eddies in the heavy oil pipeline.

The disclosed technology further relates to a method of injecting a drag reducing polymer formulation in which the drag reducing polymer formulation comprises at least about 25,000 repeat units.

The disclosed technology further relates to a method of injecting a drag reducing polymer formulation in which the drag reducing polymer formulation has a weight average molecular weight of at least $1 \times 10^6$ g/mol.

The disclosed technology further relates to a method of injecting a drag reducing polymer formulation in which the kerosene additive comes from a source different than the hydrocarbon pipelines.

The disclosed technology further relates to a method of injecting a drag reducing polymer formulation in which the incorporation of kerosene additive does not affect the stability of the latex drag reducing polymer.

The disclosed technology further relates to a method of injecting a drag reducing polymer formulation in which the hydrocarbon additive has a distillation temperature of 300° C. and below.

The disclosed technology further relates to a method of injecting a drag reducing polymer formulation in which from about 3 wt % to about 30 wt % of the hydrocarbon additive is incorporated into the drag reducing polymer.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

A method of forming a drag reducing polymer formulation. The method begins by forming a drag reducing polymer. A hydrocarbon additive is then incorporated with the drag reducing polymer to form a drag reducing polymer formulation. The drag reducing polymer formulation is then used as a drag reducer in hydrocarbon pipelines.

The drag reducing polymer formed can be any conventionally known drag reducing polymer. Examples of drag reducing polymers that can be used include latex drag reducing polymer and those formed via emulsion polymerization. Hereby incorporated by reference, U.S. Pat. No. 8,022,118 describes various drag reducing polymers that can be used in the present method.

In one embodiment, the drag reducing polymer can comprise a plurality of repeating units of the residues of one or more of the monomers selected from the group consisting of:

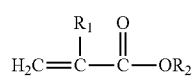

(A)

repeating wherein $R_1$ is H or a C1-C10 alkyl radical, and $R_2$ is H, a C1-C30 alkyl radical, a C5-C30 substituted or unsubstituted cycloalkyl radical, a C6-C20 substituted or unsubstituted aryl radical, an aryl-substituted C1-C10 alkyl radical, a —(CH2CH2O)$_x$—$R_4$ or —(CH2CH(CH3)O)$_x$—$R_4$ radical wherein x is in the range of from 1 to 50 and $R_4$ is H, a C1-C30 alkyl radical, or a C6-C30 alkylaryl radical;

$R_3$-arene-$R_4$    (B)

wherein arene is a phenyl, naphthyl, anthracenyl, or phenanthrenyl, $R_3$ is CH=CH$_2$ or CH$_3$—C=CH$_2$, and $R_4$ is H, a C1-C30 alkyl radical, a C5-C30 substituted or unsubstituted cycloalkyl radical, Cl, SO$_3$, OR$_B$, or COOR$_C$, wherein R$_B$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical, and wherein R$_C$ is H, a C1-C30 alkyl radical, a C5-C30 substituted or unsubstituted cycloalkyl radical, a C6-C20 substituted or unsubstituted aryl radical, or an aryl-substituted C1-C10 alkyl radical;

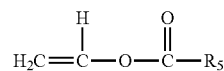

(C)

wherein $R_5$ is H, a C1-C30 alkyl radical, or a C6-C20 substituted or unsubstituted aryl radical;

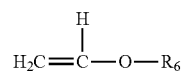

(D)

wherein $R_6$ is H, a C1-C30 alkyl radical, or a C6-C20 substituted or unsubstituted aryl radical;

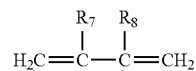

(E)

wherein $R_7$ is H or a C1-C18 alkyl radical, and $R_8$ is H, a C1-C18 alkyl radical, or Cl;

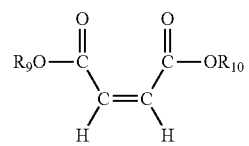

(F)

wherein $R_9$ and $R_{10}$ are independently H, a C1-C30 alkyl radical, a C6-C20 substituted or unsubstituted aryl radical, a C5-C30 substituted or unsubstituted cycloalkyl radical, or heterocyclic radicals;

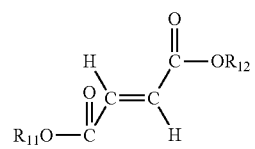

(G)

wherein $R_{11}$ and $R_{12}$ are independently H, a C1-C30 alkyl radical, a C6-C20 substituted or unsubstituted aryl radical, a C5-C30 substituted or unsubstituted cycloalkyl radical, or heterocyclic radicals;

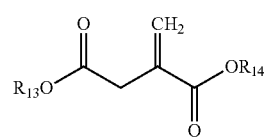

(H)

wherein $R_{13}$ and $R_{14}$ are independently H, a C1-C30 alkyl radical, a C6-C20 substituted or unsubstituted aryl radical, a C5-C30 substituted or unsubstituted cycloalkyl radical, or heterocyclic radicals;

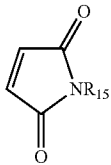

(I)

wherein $R_{15}$ is H, a C1-C30 alkyl radical, a C6-C20 substituted or unsubstituted aryl radical, a C5-C30 substituted or unsubstituted cycloalkyl radical, or heterocyclic radicals;

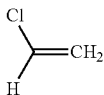

(J)

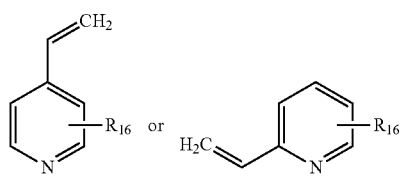

(K)

wherein $R_{16}$ is H, a C1-C30 alkyl radical, or a C6-C20 aryl radical;

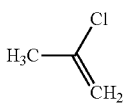

(L)

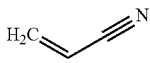

(M)

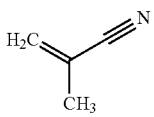

(N)

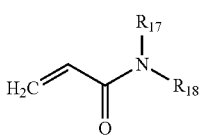

(O)

wherein $R_{17}$ and $R_{18}$ are independently H, a C1-C30 alkyl radical, a C6-C20 substituted or unsubstituted aryl radical, a C5-C30 substituted or unsubstituted cycloalkyl radical, or heterocyclic radicals; and

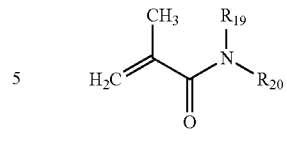

(P)

wherein $R_{19}$ and $R_{20}$ are independently H, a C1-C30 alkyl radical, a C6-C20 substituted or unsubstituted aryl radical, a C5-C30 substituted or unsubstituted cycloalkyl radical, or heterocyclic radicals.

In one embodiment, the drag reducing polymer can comprise repeating units of the residues of C4-C20 alkyl, C6-C20 substituted or unsubstituted aryl, or aryl-substituted C1-C10 alkyl ester derivatives of methacrylic acid or acrylic acid. In another embodiment, the drag reducing polymer can be a copolymer comprising repeating units of the residues of 2-ethylhexyl methacrylate and the residues of at least one other monomer. In yet another embodiment, the drag reducing polymer can be a copolymer comprising repeating units of the residues of 2-ethylhexyl methacrylate monomers and butyl acrylate monomers. In still another embodiment, the drag reducing polymer can be a homopolymer comprising repeating units of the residues of 2-ethylhexyl methacrylate.

In one embodiment, the drag reducing polymer can comprise the residues of at least one monomer having a heteroatom. As stated above, the term "heteroatom" includes any atom that is not a carbon or hydrogen atom. Specific examples of heteroatoms include, but are not limited to, oxygen, nitrogen, sulfur, phosphorous, and/or chlorine atoms. In one embodiment, the drag reducing polymer can comprise at least about 10 percent, at least about 25 percent, or at least 50 percent of the residues of monomers having at least one heteroatom. Additionally, the heteroatom can have a partial charge. As used herein, the term "partial charge" is defined as an electric charge, either positive or negative, having a value of less than 1.

The surfactant used in the above-mentioned reaction mixture can include at least one high HLB anionic or nonionic surfactant. The term "HLB number" refers to the hydrophile-lipophile balance of a surfactant in an emulsion. The HLB number is determined by the methods described by W. C. Griffin in *J. Soc. Cosmet. Chem.*, 1, 311 (1949) and *J. Soc. Cosmet. Chem.*, 5, 249 (1954), which are incorporated herein by reference. As used herein, the term "high HLB" shall denote an HLB number of 7 or more. The HLB number of surfactants for use with forming the reaction mixture can be at least about 8, at least about 10, or at least 12.

Exemplary high HLB anionic surfactants include, but are not limited to, high HLB alkyl sulfates, alkyl ether sulfates, dialkyl sulfosuccinates, alkyl phosphates, alkyl aryl sulfonates, and sarcosinates. Suitable examples of commercially available high HLB anionic surfactants include, but are not limited to, sodium lauryl sulfate (available as RHODAPON LSB from Rhodia Incorporated, Cranbury, N.J.), dioctyl sodium sulfosuccinate (available as AEROSOL OT from Cytec Industries, Inc., West Paterson, N.J.), 2-ethylhexyl polyphosphate sodium salt (available from Jarchem Industries Inc., Newark, N.J.), sodium dodecylbenzene sulfonate (available as NORFOX 40 from Norman, Fox & Co., Vernon, Calif.), and sodium lauroylsarcosinic (available as HAMPOSYL L-30 from Hampshire Chemical Corp., Lexington, Mass.).

Exemplary high HLB nonionic surfactants include, but are not limited to, high HLB sorbitan esters, PEG fatty acid esters, ethoxylated glycerine esters, ethoxylated fatty amines, ethoxylated sorbitan esters, block ethylene oxide/propylene oxide surfactants, alcohol/fatty acid esters, ethoxylated alcohols, ethoxylated fatty acids, alkoxylated castor oils, glycerine esters, linear alcohol ethoxylates, and alkyl phenol ethoxylates. Suitable examples of commercially available high HLB nonionic surfactants include, but are not limited to, nonylphenoxy and octylphenoxy poly (ethyleneoxy) ethanols (available as the IGEPAL CA and CO series, respectively from Rhodia, Cranbury, N.J.), C8 to C18 ethoxylated primary alcohols (such as RHODASURF LA-9 from Rhodia Inc., Cranbury, N.J.), C11 to C15 secondary-alcohol ethoxylates (available as the TERGITOL 15-S series, including 15-S-7, 15-S-9, 15-S-12, from Dow Chemical Company, Midland, Mich.), polyoxyethylene sorbitan fatty acid esters (available as the TWEEN series of surfactants from Uniquema, Wilmington, Del.), polyethylene oxide (25) oleyl ether (available as SIPONIC Y-500-70 from Americal Alcolac Chemical Co., Baltimore, Md.), alkylaryl polyether alcohols (available as the TRITON X series, including X-100, X-165, X-305, and X-405, from Dow Chemical Company, Midland, Mich.).

In one embodiment, the initiation system for use in the above-mentioned reaction mixture can be any suitable system for generating free radicals necessary to facilitate emulsion polymerization. Possible initiators include, but are not limited to, persulfates (e.g., ammonium persulfate, sodium persulfate, potassium persulfate), peroxy persulfates, and peroxides (e.g., tert-butyl hydroperoxide) used alone or in combination with one or more reducing components and/or accelerators. Possible reducing components include, but are not limited to, bisulfites, metabisulfites, ascorbic acid, erythorbic acid, and sodium formaldehyde sulfoxylate. Possible accelerators include, but are not limited to, any composition containing a transition metal having two oxidation states such as, for example, ferrous sulfate and ferrous ammonium sulfate. Alternatively, known thermal and radiation initiation techniques can be employed to generate the free radicals. In another embodiment, any polymerization and corresponding initiation or catalytic methods known by those skilled in the art may be used in the present invention. For example, when polymerization is performed by methods such as addition or condensation polymerization, the polymerization can be initiated or catalyzed by methods such as cationic, anionic, or coordination methods.

When water is used to form the above-mentioned reaction mixture, the water can be purified water such as distilled or deionized water. However, the continuous phase of the emulsion can also comprise polar organic liquids or aqueous solutions of polar organic liquids, such as those listed below.

As previously noted, the reaction mixture optionally can include a buffer. The buffer can comprise any known buffer that is compatible with the initiation system such as, for example, carbonate, phosphate, and/or borate buffers.

As previously noted, the reaction mixture optionally can include at least one hydrate inhibitor. The hydrate inhibitor can be a thermodynamic hydrate inhibitor such as, for example, an alcohol and/or a polyol. In one embodiment, the hydrate inhibitor can comprise one or more polyhydric alcohols and/or one or more ethers of polyhydric alcohols. Suitable polyhydric alcohols include, but are not limited to, monoethylene glycol, diethylene glycol, triethylene glycol, monopropylene glycol, and/or dipropylene glycol. Suitable ethers of polyhydric alcohols include, but are not limited to, ethylene glycol monomethyl ether, diethylene glycol monomethyl ether, propylene glycol monomethyl ether, and dipropylene glycol monomethyl ether.

Generally, the hydrate inhibitor can be any composition that when mixed with distilled water at a 1:1 weight ratio produces a hydrate inhibited liquid mixture having a gas hydrate formation temperature at 2,000 psia that is lower than the gas hydrate formation temperature of distilled water at 2,000 psia by an amount in the range of from about 10 to about 150° F., in the range of from about 20 to about 80° F., or in the range of from 30 to 60° F. For example, monoethylene glycol qualifies as a hydrate inhibitor because the gas hydrate formation temperature of distilled water at 2,000 psia is about 70° F., while the gas hydrate formation temperature of a 1:1 mixture of distilled water and monoethylene glycol at 2,000 psia is about 28° F. Thus, monoethylene glycol lowers the gas hydrate formation temperature of distilled water at 2,000 psia by about 42° F. when added to the distilled water at a 1:1 weight ratio. It should be noted that the gas hydrate formation temperature of a particular liquid may vary depending on the compositional make-up of the natural gas used to determine the gas hydrate formation temperature. Therefore, when gas hydrate formation temperature is used herein to define what constitutes a "hydrate inhibitor," such gas hydrate temperature is presumed to be determined using a natural gas composition containing 92 mole percent methane, 5 mole percent ethane, and 3 mole percent propane.

In forming the reaction mixture, the monomer, water, the at least one surfactant, and optionally the hydrate inhibitor, can be combined under a substantially oxygen-free atmosphere that is maintained at less than about 1,000 ppmw oxygen or less than about 100 ppmw oxygen. The oxygen-free atmosphere can be maintained by continuously purging the reaction vessel with an inert gas such as nitrogen and/or argon. The temperature of the system can be kept at a level from the freezing point of the continuous phase up to about 60° C., in the range of from about 0 to about 45° C., or in the range of from 0 to 30° C. The system pressure can be maintained in the range of from about 5 to about 100 psia, in the range of from about 10 to about 25 psia, or about atmospheric pressure. However, higher pressures up to about 300 psia can be necessary to polymerize certain monomers, such as diolefins.

Next, a buffer can be added, if required, followed by addition of the initiation system, either all at once or over time. The polymerization reaction is carried out for a sufficient amount of time to achieve at least about 90 percent conversion by weight of the monomers. Typically, this time period is in the range of from between about 1 to about 10 hours, or in the range of from 3 to 5 hours. During polymerization, the reaction mixture can be continuously agitated.

The following table sets forth approximate broad and narrow ranges for the amounts of the ingredients present in the reaction mixture.

| Ingredient | Broad Range | Narrow Range |
|---|---|---|
| Monomer (wt. % of reaction mixture) | 10-60% | 30-50% |
| Water (wt. % of reaction mixture) | 20-80% | 50-70% |
| Surfactant (wt. % of reaction mixture) | 0.1-10% | 0.25-6% |
| Initiation system | | |
| Monomer:Initiator (molar ratio) | $1 \times 10^3$:1-$5 \times 10^6$:1 | $5 \times 10^3$:1-$2 \times 10^6$:1 |

-continued

| Ingredient | Broad Range | Narrow Range |
|---|---|---|
| Monomer:Reducing Comp. (molar ratio) | $1 \times 10^3{:}1\text{-}5 \times 10^6{:}1$ | $1 \times 10^4{:}1\text{-}2 \times 10^6{:}1$ |
| Accelerator:Initiator (molar ratio) | 0.001:1-10:1 | 0.005:1-1:1 |
| Buffer | 0 to amount necessary to reach pH of initiation (initiator dependent, typically between about 6.5-10) | |
| Optional hydrate inhibitor | If present, the hydrate inhibitor can have a hydrate inhibitor-to-water weight ratio from about 1:10 to about 10:1, about 1:5 to about 5:1, or 2:3 to 3:2. | |

The emulsion polymerization reaction yields a latex composition comprising a dispersed phase of solid particles and a liquid continuous phase. The latex can be a stable colloidal dispersion comprising a dispersed phase of high molecular weight polymer particles and a continuous phase comprising water. The colloidal particles can comprise in the range of from about 10 to about 60 percent by weight of the latex, or in the range of from 40 to 50 percent by weight of the latex. The continuous phase can comprise water, the high HLB surfactant, the hydrate inhibitor (if present), and buffer as needed. Water can be present in the range of from about 20 to about 80 percent by weight of the latex, or in the range of from about 40 to about 60 percent by weight of the latex. The high HLB surfactant can comprise in the range of from about 0.1 to about 10 percent by weight of the latex, or in the range of from 0.25 to 6 percent by weight of the latex. As noted in the table above, the buffer can be present in an amount necessary to reach the pH required for initiation of the polymerization reaction and is initiator dependent. Typically, the pH required to initiate a reaction is in the range of from 6.5 to 10.

When a hydrate inhibitor is employed in the reaction mixture, it can be present in the resulting latex in an amount that yields a hydrate inhibitor-to-water weight ratio in the range of from about 1:10 to about 10:1, in the range of from about 1:5 to about 5:1, or in the range of from 2:3 to 3:2. Alternatively, all or part of the hydrate inhibitor can be added to the latex after polymerization to provide the desired amount of hydrate inhibitor in the continuous phase of the latex.

In one embodiment the drag reducing polymer of the dispersed phase of the latex can have a weight average molecular weight ($M_w$) of at least about $1 \times 10^6$ g/mol, at least about $2 \times 10^6$ g/mol, or at least $5 \times 10^6$ g/mol. The colloidal particles of drag reducing polymer can have a mean particle size of less than about 10 microns, less than about 1,000 nm (1 micron), in the range of from about 10 to about 500 nm, or in the range of from 50 to 250 nm. At least about 95 percent by weight of the colloidal particles can be larger than about 10 nm and smaller than about 500 nm. At least about 95 percent by weight of the particles can be larger than about 25 nm and smaller than about 250 nm. The continuous phase can have a pH in the range of from about 4 to about 10, or in the range of from about 6 to about 8, and contains few if any multi-valent cations.

In one embodiment, the drag reducing polymer can comprise at least about 10,000, at least about 25,000, or at least 50,000 repeating units selected from the residues of the above mentioned monomers. In one embodiment, the drag reducing polymer can comprise less than 1 branched unit per each monomer residue repeating unit. Additionally, the drag reducing polymer can comprise less than 1 linking group per each monomer residue repeating unit. Furthermore, the drag reducing polymer can exhibit little or no branching or crosslinking. Also, the drag reducing polymer can comprise perfluoroalkyl groups in an amount in the range of from about 0 to about 1 percent based on the total number of monomer residue repeating units in the drag reducing polymer The hydrocarbon additive added after the formation of the drag reducing polymer can be any conventionally known hydrocarbon additive. In one embodiment the hydrocarbon additive can be chosen from hydrocarbons such as heptane, isooctane, kerosene, N-Paraffin depleted kerosene, and combinations thereof. In an alternate embodiment the hydrocarbon additive comes from a source different than the hydrocarbon pipelines. Any known amount of hydrocarbon additive can be added to the drag reducing polymer as long as it does not affect the stability of the drag reducing polymer. In one embodiment from about 3 wt % to about 16 wt % hydrocarbon additive is incorporated with the drag reducer. In one embodiment, from about 3 wt % to about 30 wt % hydrocarbon additive is incorporated with the drag reducer.

In an alternate embodiment the hydrocarbon additive can have a distillation temperature of around 300° C. and below. In other embodiments the distillation temperature can be around 275° C. and below, 250° C. and below, 258° C. and below, 225° C. and below, 200° C. and below, 175° C. and below, 150° C. and below, 126° C. and below or even 100° C. and below.

The following examples of certain embodiments of the invention are given. Each example is provided by way of explanation of the invention, one of many embodiments of the invention, and the following examples should not be read to limit, or define, the scope of the invention.

Sample Preparation

Hydrocarbon additives were post-added at various levels to pre-made drag reducer formulations. The resulting samples were rolled to ensure uniform distribution before testing.

LMI Pump Test

Milton Roy LMI B7 series pumps were also used to screen the pumping performance of product formulations in the lab. Approximately 1 Liter of sample was added to a container equipped with a feed and return port and recirculated continuously via the pump at a rate of approximately 180 g/min. After a period of time, depending on the testing protocol, the pump was stopped and the clear acrylic pump head was removed. The inside surface of the head and the diaphragm were lightly rinsed with water to remove residual latex prior to collecting any adhered film that had formed. The film was collected in a tared tin and allowed to dry at ambient conditions for 24 h prior to weighing.

TABLE 1

Five hour LMI pump test results of drag reducer with hydrocarbon additives.

| Additive | Test duration (h) | Mass on diaphragm (g) |
|---|---|---|
| Toluene (8%) | 5 | 0.000 |
| Kerosene (12%) | 5 | 0.0109 |
| 1-decene (8%) | 5 | 0.027 |
| 1-decene (4%) | 5 | 0.149 |
| No additive | 5 | 0.292 |
| No additive | 5 | 0.121 |

TABLE 2

Three hour LMI pump test results of drag reducer with hydrocarbon additives.

| Additive | Test duration (h) | Mass on diaphragm (g) |
|---|---|---|
| Heptane (12%) | 3 | 0.000 |
| Isooctane (12%) | 3 | 0.000 |
| Kerosene (12%) | 3 | 0.000 |
| Molex Raffinate (12%) | 3 | 0.001 |
| Hexane (6%) | 3 | 0.024 |
| Kerosene (6%) | 3 | .0421 |
| Isooctane (6%) | 3 | 0.043 |
| Kerosene (10%) | 3 | 0.061 |
| No additive | 3 | 0.0768 |
| No additive | 3 | 0.08 |
| No Additive | 3 | 0.0973 |

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method of forming a drag reducing polymer formulation comprising:
   forming a drag reducing polymer; and
   incorporating a hydrocarbon additive with the drag reducing polymer to form the drag reducing polymer formulation;
   wherein from about 3 wt % to about 30 wt % hydrocarbon additive is incorporated with the drag reducing polymer.

2. The method of claim 1, wherein the drag reducing polymer is a latex drag reducing polymer.

3. The method of claim 1, wherein the drag reducing polymer is formed via emulsion polymerization.

4. The method of claim 1, wherein the hydrocarbon additive is selected from the group consisting of: heptane, isooctane, kerosene, N-Paraffin depleted kerosene, and combinations thereof.

5. The method of claim 1, wherein the hydrocarbon additive has a distillation temperature less than 275° C.

6. The method of claim 1, wherein the drag reducing polymer suppresses the growth of turbulent eddies in hydrocarbon pipelines.

7. The method of claim 1, wherein the drag reducing polymer comprises at least about 25,000 repeating units.

8. The method of claim 1, wherein the drag reducing polymer has a weight average molecular weight of at least $1\times10^6$ g/mol.

9. The method of claim 1, wherein from about 3 wt % to about 16 wt % hydrocarbon additive is incorporated with the drag reducing polymer.

10. The method of claim 6, wherein the hydrocarbon additive comes from a source different than the hydrocarbon pipelines.

11. The method of claim 1, wherein the incorporation of the hydrocarbon additive does not affect the stability of the drag reducing polymer.

12. A method of forming a drag reducing polymer formulation consisting essentially of:
   forming a latex drag reducing polymer via emulsion polymerization; and
   incorporating from about 3 wt % to about 30 wt % of kerosene additive to the latex drag reducing polymer to form the drag reducing polymer formulation.

13. A method of injecting a drag reducing polymer formulation consisting essentially of:
   forming a latex drag reducing polymer via emulsion polymerization;
   incorporating from about 3 wt % to about 30 wt % of kerosene additive to the latex drag reducing polymer to form the drag reducing polymer formulation; and
   injecting the drag reducing polymer formulation into a heavy oil pipeline.

14. The method of claim 13, wherein the latex drag reducing polymer suppresses the growth of turbulent eddies in the heavy oil pipeline.

15. The method of claim 13, wherein the latex drag reducing polymer comprises at least about 25,000 repeating units.

16. The method of claim 13, wherein the latex drag reducing polymer has a weight average molecular weight of at least $1\times10^6$ g/mol.

17. The method of claim 13, wherein the kerosene additive comes from a source different than the hydrocarbon pipelines.

18. The method of claim 13, wherein the incorporation of kerosene additive does not affect the stability of the latex drag reducing polymer.

19. The method of claim 1, wherein the hydrocarbon additive has a distillation temperature of 300° C. and below.

* * * * *